United States Patent [19]

Barda et al.

[11] 4,213,124
[45] Jul. 15, 1980

[54] SYSTEM FOR DIGITALLY TRANSMITTING AND DISPLAYING TEXTS ON TELEVISION SCREEN

[75] Inventors: Jean F. Barda, Gentilly; Roger Brusq, Betton; Bernard Marti, Noyal sur Vilaine; Alain Poignet, Rennes, all of France

[73] Assignees: Etablissement Public de Diffusion dit "Telediffusion de France"; L'Etat Francais, both of Montrouge, France

[21] Appl. No.: 833,157

[22] Filed: Sep. 14, 1977

[30] Foreign Application Priority Data

Sep. 22, 1976 [FR] France ............................. 76 29034

[51] Int. Cl.² ........................................... G06F 3/14
[52] U.S. Cl. .................................... 340/706; 340/721; 340/750; 340/798; 340/802
[58] Field of Search ............... 340/324, 706, 711, 721, 340/744, 748, 750, 789, 802, 803, 804, 798, 799

[56] References Cited
U.S. PATENT DOCUMENTS

| | | | |
|---|---|---|---|
| 3,524,182 | 8/1970 | Criscimagna et al. | 340/154 |
| 3,603,962 | 9/1971 | Lechner | 340/324 AD |
| 3,771,155 | 11/1973 | Hayashi et al. | 340/324 AD |
| 3,854,130 | 12/1974 | Ligocki | 340/324 AD |
| 3,877,009 | 4/1975 | Kanie et al. | 340/324 AD |
| 3,891,792 | 6/1975 | Kimura | 340/324 AD |
| 3,896,428 | 7/1975 | Williams | 340/324 AD |
| 3,944,993 | 3/1976 | Dalke et al. | 340/324 AD |
| 3,974,493 | 8/1976 | De Cavaignac et al. | 340/324 AD |
| 4,064,561 | 12/1977 | Jennings | 340/324 AD |

Primary Examiner—Marshall M. Curtis
Attorney, Agent, or Firm—Laff, Whitesel & Rockman

[57] ABSTRACT

In the disclosed teletext system, the transmitter station broadcasts data packs data from several channels, the data packs being time multiplexed. Each data pack comprises a prefix signal for causing a teletext receiver either to accept the data packs of a selected channel or to reject data packs from other channels. In addition to the prefix, and possibly page flags followed by page numbers and row flags followed by row numbers, the sequence of eight-bit words, transmitted in a pack, may comprise escape eight-bit words which are followed by type identity eight-bit words, themselves followed by a sequence of characters to be displayed in the same type the identity of which is determined by the preceding type identity eight-bit words. Each teletext receiver comprises, a first conventional random access memory storing the coded characters, a second random access memory storing the type identity eight-bit words at the same addresses as those of the characters belonging to the sequence in the first random access memory. A read operation from the first random access memory, for display purpose, is performed at the same time as the read operation from the second random access memory. The output signals of the second memory select a character generator which includes a permanent memory which reads out the shape of those characters which read out from the first random access memory.

4 Claims, 3 Drawing Figures

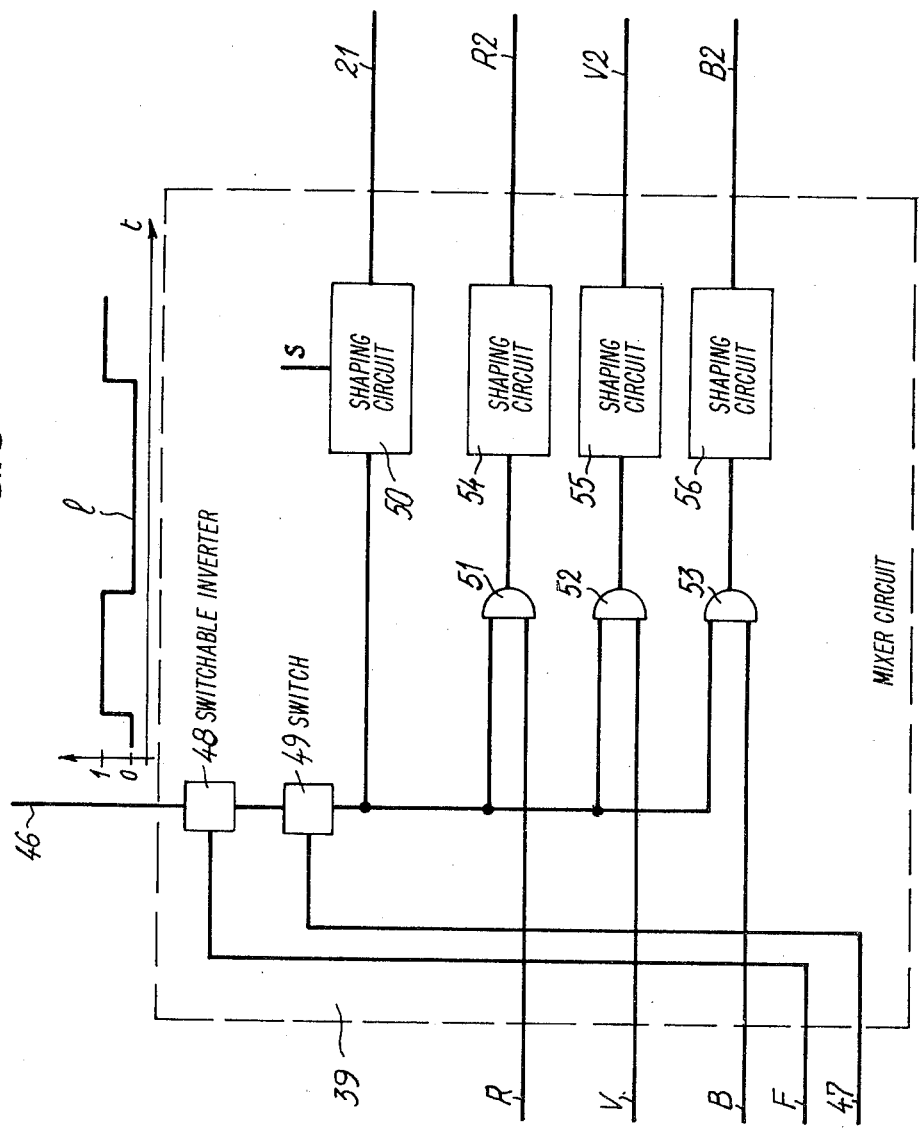

SYSTEM FOR DIGITALLY TRANSMITTING AND DISPLAYING TEXTS ON TELEVISION SCREEN

The present invention relates to improvements to systems for digitally transmitting texts and displaying them on a television screen. In the following description such systems will be called "teletext systems". More particularly this invention relates to improvements to the teletext system that has been described in the U.S. patent application Ser. No. 830,165, filed Sept. 2, 1977, (corresponding to the French Patent Application No. 76 27212 filed on Sept. 6, 1976 in the joint names, Mr. A. Poignet, Miss Le Marouille and Mr. Fournier).

In the teletext system described in that patent application, a signal source broadcasts or transmits data in the form of "data packs." Those data packs may be delivered from a plurality of channels. The set of data packs regarding a channel constitutes a "magazine" made of a plurality of "pages". Data packs from various channels can be encoded and multiplexed as described in the U.S. patent application Ser. No. 689,493 filed on June 3, 1976 in the name of Y. M. Guinet et al and entitled "One way data transmission system". Data packs belonging to a magazine page are not time multiplexed with data packs of other pages of the same magazine. In a page, data begins with a page flag followed by data indicating the page number, and ends with the next page flag. In each page of data are grouped in datarows. The word "row" that corresponds to a character line in a page is utilized to avoid any interference with television scanning lines. In each row, data are preceded by a row flag followed by the row number, and followed by the next row flag.

In every system receiver a decoding key may be used by a subscriber viewer which enables him to select the data packs relating to the desired channel, data packs belonging to other channels being cancelled. Thus, a decoding key makes it possible to receive all the data packs of a magazine that the source is periodically broadcasting. Moreover the teletext system receiver comprises a keyboard on which the subscriber may dial the number of a desired page within a magazine so that only those data which belong to the selected page are trasmitted to the teletext system receiver character generator.

The present invention relates to the selection of a magazine by means of a decoding key. It does not relate to the selection of a page by means of a keyboard. But it relates to an arrangement of transmitted signals. Means are provided in each teletext system data receiver for possibly varying the appearance of texts displayed on television screens so as to depart from the current display appearances. For instance, those variations may affect the character color, background color, flashing on or off for certain characters, changes in character height and/or width, etc.

A character generator for displaying characters on a television receiver cathode ray tube screen comprises a permanent memory associated with a random access memory. The permanent memory stores the shape information for every character which can be displayed. The random access memory stores the character codes, including the spacings or blanks between words forming the text to be displayed. In the random access memory, the character codes are stored at addresses which correspond to the geographic positions of the associated characters in the page to be displayed. The display operation includes a sequential read-out of the rows of character from the permanent memory for causing, in a known manner, the scanning read out of the character shape of the character corresponding to the read character code. Should a character occupy ten television scanning lines, each read out operation for a row of character codes, from the random access memory, results in ten successive scannings of the character shapes from the permanent memory. Obviously, scannings are, in turn controlled by clocks which are controlled from the display tube line synchronization. The signals resulting from scanning the shape of a character are delivered in parallel, then converted into a serial mode through a shift register wherein the shift signal frequency is controlled by a clock that is, in turn, controlled from the display tube line synchronization. The output of the shift register is sampled at another frequency which is controlled by another clock, and the shift register output signal is transmitted toward the tube as a luminance signal.

Furthermore, in character transmission systems wherein each character is represented by an octet, i.e. an eight-bit word, the ASCII code is currently in use. Among the eight bits of a word, one bit is normally assigned to parity check. The 7 other bit provide 128 character possibilities. Among those 128 possibilities some are assigned to character codes and others to function codes. In addition, an escape eight-bit word makes it possible in practice to double those possibilities in currently changing the meaning of codes following an escape word.

A purpose of the present invention is to provide a teletext system wherein the display characters may be of various types that are different each from the other in the shape, color, size, background, and so on, each type of displayed character being identified by means of one or several eight-bit words corresponding to the character type identity.

According to another feature of the present invention, there is provided a system for digitally transmitting and displaying texts on a television screen wherein the sequence of the transmitted eight-bit words comprises (in addition to prefixes, page flags followed by page numbers, and row flags possibly followed by row numbers) escape eight-bit words followed by type identity eight-bit words. These signals are followed by a sequence of characters to be displayed in the same type, the identity of which is determined by the preceding type identity eight-bit words. Each system receiver includes a first conventional random access memory for storing the coded characters, and a second random access memory for storing the type identity eight-bit words at the same addresses as the addresses of the characters belonging to the sequence in the first random access memory. A read operation is taken from the first access memory, for display purpose at the same time as the read operation from the second random access memory whose output signal selects a character generator permanent memory, from which the shape of characters read out from the first random access memory is to be read out, and/or controls the luminance and/or chrominance in the display tube at the time when the characters are displayed on the television tube.

According to another feature of this invention, the type identity eight-bit words following an escape eight-bit word comprise an identity component eight-bit word followed by an escape eight-bit word per character identity component, save the last identity component eight-bit word that is directly followed by the first character eight-bit word of a sequence of characters which the type is assigned to. The received data is applied to a switching circuit for delivering, on the one hand, the escape eight-bit words followed by a type identity eight-bit words serially to a buffer memory and, on the other hand, character eight-bit words which are or escape eight-bit words not followed by type identity eight-bit words. This data is applied to the input of the first random access memory. A buffer memory output is connected to the second random access memory input for delivering its contents, save escape eight-bit words, to the second random access memory each time a character belonging to the sequence is written into the first random access memory. The contents of the buffer are erased when the next escape eight-bit word appears followed by a type identity or type component identity eight-bit word.

The above mentioned features of the present invention, as well as other features thereof will appear more clearly in the following description of an embodiment, the description being made in conjunction with accompanying drawings wherein:

FIG. 1 is a block diagram of the teletext system receiver described in the first above mentioned U.S. patent application, FIG. 2 is a block diagram of memory circuits and character generator which are usable, according to this invention, in the teletext system shown in FIG. 1, and FIG. 3 is a schematic diagram of a mixer circuit utilized in the receiver shown in FIG. 2.

The receiver terminal (FIG. 6 herein) shown in FIG. 2 in the first mentioned U.S. patent application, the description of which may considered in the present description. The receiver shown in FIG. 1 comprises, as a conventional television receiver, a reception-demodulation circuit 10 delivering, on the one hand, audio signals to a loud-speaker 11 and, on the other hand, video signals to a color decoder and scanning generator 12. Color signals B1 (blue), V1 (green) and R1 (red) as well as luminance signal from 12 are not transmitted directly to tube 13, contrary to what occurs in a conventional television receiver these signals are delivered through a video switch 14 that also performs the adaptation of the tube voltage/light characteristic to the control of the synthesized signals.

Reception terminal shown in FIG. 1 further comprises a circuit 15 for separating data from the video signal, whose input is connected from video output of circuit 10 and output is connected to a first selection block 16, which is similar to the terminal equipment described in U.S. patent application No. 689,493. The output of block 16 is connected through a link J to a page selection block and data decoder 17 whose output is connected to the input of a page memory 18. A viewer kayboard 19 has its output suitably connected to control inputs of blocks 16 and 17. The output of memory 18 is connected to the input of a character generator 20. The signal outputs of character generator 20 are connected to color inputs R2 (red), V2 (green) and B2 (blue) of video switch 14 as well as to a luminance input 21. A control output 22 of keyboard 19 is also connected to a control input of video switch 14.

It is to be noted that link J is preferably of the type described in the French Pat. No. 2,268,308. It makes it possible an asynchronous operation from selector 16 to page selector 17. Furthermore, in an alternative embodiment, the input of link J may be connected from a cable teletext distribution network, for instance utilizing the public telephone network.

In circuit 15, a stable oscillator, not shown, regenerates the bit rate frequency. Then, processing circuits treat the bits arranged in 8-bit words or octets as described in U.S. patent application No. 689,493, particularly regarding validation by a key for receiving the desired channel, as described in FIG. 6 of the U.S. patent application.

Assuming the validation is positive, the received bits are sent to block 17 through link J. In practice, in the described embodiment, a channel is equivalent to a magazine. Block 17 includes means for recognizing and comparing a page flag, 8-bit words. Each time that the recognition is positive, the immediately following page number 8-bit word is the desired page number which was dialled by the viewer on keyboard 19. When such a comparison is negative, received 8-bit words are destroyed as well as the following ones, up to the next recognition of a page flag. When such a comparison is positive, the received 8-bit words, up to the next page flag, are transmitted to memory 18 after having been arranged in rows by appropriate means, as described in the first mentioned U.S. patent application. It is simply remembered that each row is preceded by a row flag, followed by a 8-bit word indicating the height of the row on the page and defining one address for the characters to be stored in memory 18, the other address for each character being defined by the position of the character 8-bit word, in the row.

In the described embodiment according to the present invention, page memory block 18 and character generator 20 are designed as shown in FIG. 2. In practice, memory 18 comprises two random access memories or RAM memories 23 and 24, as well as a switching circuit 25 and a buffer memory 26. The input of switching circuit 25 is connected, via line 27, from the output of circuit 17, FIG. 1 that delivers character 8-bit words and row function 8-bit words. Row addressing inputs in memories 23 and 24 are parallel connected, via line 28, from output of circuit 17 which delivers the row numbers. Switching circuit 25 has an output 29 connected to the data input of memory 23 and an output 30 connected to the input of buffer memory 26. The output of buffer memory 26 is connected to the data input of memory 24.

Data which is applied to the input of switching circuit 25, is received via line 27, and may be grouped in the following families: first, in the simplest case, an alphanumeric character 8-bit word; then an escape 8-bit word plus either a character 8-bit word or a conventional function 8-bit word; and finally an escape 8-bit-word plus a character type identity 8-bit word. Switching circuit 25 includes detection means for recognizing the third family of data (escape 8-bit word plus character type identity 8-bit word). Those detection means may possibly be simple comparators, which makes it possible to send them to output 30 while the first and second family of data are sent to output 29.

By way of example, some types of identity 8-bits words will now be illustrated. A 8-bit word F1 may be provided wherein the five first bits carry, when they are in the O-condition, (i.e. have no information).

| 1st bit | 2nd bit | 3rd bit | 4th bit | 5th bit | 6th bit | 7th bit | 8th bit |
| --- | --- | --- | --- | --- | --- | --- | --- |
| Red | Green | Blue | Graphic | 1 | 0 | 0 | X |

Thus, a 8-bit word 1000100x indicates that the sequence of the characters following it must be displayed in red on the tube screen. By way of example, with a 8-bit word 0110100X, it indicates that the sequence must be displayed in cyan. When the 5th bit is 1, it indicates that the 8-bit word is a word F1; when 6th and 7th bits are 0, switching circuit 25 can detect the function 8-bit words. The meaning of the 4th bit will be described in the following specification, the 8th bit is a parity bit.

In an same manner, a 8-bit word F2 may be provided wherein the bits have the following meanings:

| 1st bit | 2nd bit | 3rd bit | 4th bit | 5th bit | 6th bit | 7th bit | 8th bit |
|---|---|---|---|---|---|---|---|
| Height | Width | Ground | Flashing | 0 | 0 | 0 | X |

When the first bit is 1, it indicates that the character height is to be doubled; when the 2nd bit is 1, it indicates that the character width is to be doubled; when the 3rd bit is 1, it indicates that the back ground onto which the character is to be displayed must have its color reversed; when the 4th bit is 1, it indicates that the character must be flashed on and off. Thus, an 8-bit word 110100X, indicates that height and width of the characters must be doubled and that they must be flashed on and off. The 5th bit, being 0, indicates that the 8-bit word is a word F2.

Now it is possible to understand that, when, in the sequence of an 8-bit words applied from switching circuit 25 to line 27, there is the following series: $\theta$ F1 $\theta$ F1 a b c . . . , switching circuit 25 will write the four words $\theta$ F1 $\theta$ F1 into buffer memory 26; then, the words a b c . . . , are written into memory 23. The writing of the first character word a into memory 23 is detected in circuit 31 which then initiates writing at the same address into memory 24 of word of the words F1 and F2 from buffer memory 26 (words $\theta$ being not transmitted from buffery memory 26 to memory 24). Circuit 31 is connected by control line 32 to memory 26. Buffer memory 26 is connected to RAM memory 24 by line 33.

The read out from buffer memory 26 into random access memory 24 does not alter the contents of memory 26. Thus, when writing b into random access memory 23, F1 and F2 are written at the same address as b into memory 23. As a conclusion, at corresponding addresses, character words and identity words are written into memory 24. Contents of memory 26 are erased at the next writing into that buffer memory 24 of an escape word followed by an identity word.

In addition of function words F1 and F2, other function words may also be provided, as for instance F3 making it possible to change from a first character shape to another character shape, together 5th and 7th bits, and then indicate an identity word which is detected in switching circuit 25, 6th bit being 0 and 8th bit still being a parity bit.

Character generator 20, shown in FIG. 2, comprises four permanent memories 34-37, a switch 38, a mixing circuit 39 and a monostable circuit 40. Each permanent memory 34-37 is associated respectively with a shift register 41-44 designed for delivering serially, the bits conventionally read in parallel from a character generator into a permanent memory. It is reminded that the scanning of character shape is performed in memories 34-37, line per line, each line basically corresponding to a television picture line. A clock 45 is also provided, which controls read operations from the memories in accordance with television picture line synchronization signals. In FIG. 2, some inputs S are also indicated, which mean that television line synchronization signals are also used for reading the concerned memories or controlling repetitive operations; however, to simplify the drawing, all the inputs S are not indicated.

Switch 38 is provided for selecting the one of the registers 41-44 that is through be to its output 46 connected to mixing circuit 39; it also determines the read-out operation rate, or in other words the sampling rate of register outputs.

The read-out output of RAM memory 23 is parallel connected to read-out address inputs of permanent memories 34-37. Parallel read-out, outputs of memories 34-37 are respectively connected to parallel inputs of registers 41-44.

The read-out output of RAM memory 24 has as there are many wires as significant bits in function words F1, F2 and F3. Thus indicated are wires R, G, B respectively corresponding to the first 3 bits of F1, wire H corresponding to the third bit of F2 and wire C corresponding to the fourth bit of F2. In addition, there is a line M comprising four wires corresponding to the significant bits, of F3, which are in the described example assumed to be two bits since four permanent memories are provided.

Wire H is connected to a control input of clock 45. When wire H is at a low potential, clock 45 operates at a normal rate, i.e. for each picture line RAM memory 23 is read as well as a character shape line stored in the permanent memories 34-37, that line corresponding to the address read out from memory 23. When wire H is at a high potential, the clock rate of clock 45 is divided by two. Clock 45 designates, after counting, the address of the line to be read in the character shapes of the permanent memories. When wire H is at a high potential, each character shape line is successively read twice at the picture line frequency. Thus the height of the displayed character occupies twice the normal number of lines on the tube screen. Its height is doubled.

Wire L included two wires, one wire L1 controlling the bit shift rate in registers 41-44, the other wire L2 controlling the horizontal address progress rate in RAM memory 23, via input L2. Obviously those two rates are also related to the television picture line synchronization. When wire L is at a low potential, the shift rate and sampling rate are normal. When wire L is at a high potential, the shift rate and sampling rate are both divided by two so that the same bit stays twice the normal length of time in the output cell of each shift register and therefore can be sampled twice. Thus a character point information can be sent to the display tube in the picture line. Accordingly the character width is doubled. As a character then occupies a wider place in the displayed row, it is necessary, through wire L2, to reduce by two the progress of the character words in the corresponding row in 51.

The four wires of line M make it possible to select the permanent memory whose output is utilized among memories 34-37. Indeed it appears that at each read-out operation from memory 23, the four memories 34-37 are parallel read out. However, switch 38 allows only one connection to be made between circuits 34-37 and the mixer circuit 39. The four permanent memories 34-37 respectively store four alphabets. Thus, it appears that two bits of words F3, in a simple manner, change the language depending on the texts to be displayed.

When the potential on wire C is low, monostable circuit 40 is at rest. When the potential on wire C is high, monostable circuit 40 is triggered on. The monostable circuit rate may be about 1 Hz and is used as described hereabove for flashing characters on and off.

Reference will now be made to FIG. 3 for describing the purposes of wires R, V (or G), B and F. FIG. 3 still shows wire 46 connecting the output of switch 38 (FIG. 2) to mixer circuit 39, as well as output wire 47 from monostable circuit 40 (FIG. 2). First it is reminded that wire 46 carries digital signals relating to the luminance information. At each character shape line scanning in a permanent memory, and after the parallel-serially conversion in the corresponding shift register, the signal transmitted from switching circuit 38 over wire 46 is shaped as indicated by the wave form l, FIG. 3. When signal l is high, a spot is lit on the tube; when signal l is low, the background does not light. Wire 46 is connected to input of a switchable inverter circuit 48 whose output is connected to a switch 49. The signal output of switch 49 is connected, on the one hand, to output 21 through a shaping circuit 50 and, on the other hand, and in parallel, to the first inputs of three AND gates 51, 52 and 53. The second input of gate 51 is connected from wire R, the second input of gate 52 is connected from wire V (or G), and second input of gate 53 is connected from wire B. The output of gate 51 is connected to wire R2 through a shaping circuit 54, the output of gate 52 is connected to wire V2 through a shaping circuit 55, and the output of gate 53 is connected to wire B2 through a shaping circuit 56. The control input of switchable inverter circuit 48 is connected to A wire F while the control input of switch 49 is connected to A wire 47.

Assuming that wires F and 47 are at rest in the 0-condition or low potential, signal l from wire 46 is applied without change to switching circuit 50 and gates 51–53. From output 21 of circuit 50, the output signal is processed in the switching circuit 14, FIG. 1, shown in detail in FIG. 3. In addition, assuming that wire R (or G) is in the 1-condition or high potential, conditions 1 of signal l are transmitted through gate 51 and applied to shaping circuit 54 before being processed in switching circuit 14, FIG. 1. Thus it appears that the red chrominance signal is similar to the luminance signal that causes the character to be displayed in red. When wires R and V (or G) are high, conditions 1 of l are transmitted and wires R2 and V2 become high, the color mix being performed in the tube 13 after processing in switching circuit 14. Thus, it characters may be displayed in white or one of six predetermined colors by using the first three bits of word F1.

When wire F is in the 1-condition or high potential, the output signal from switchable inverter 48 is reversed with respect to l, i.e. $\bar{l}$. Such an output signal is still processed in gates 51–53, as signal l, but contrary to the previous described case, only the parts outside of the characters corresponding to conditions 0 of 1 appear displayed in color.

When wire 47 is periodically turned to the 1-condition, transmission of signal l is interrupted through circuit 49 during those 1-conditions. As a result the luminance signal is accordingly interrupted which causes the character to flash on and off on the display.

Shaping circuit 50 is also utilized for adding the digital synchronization signal to the luminance signal, as indicated by S.

Also to be noted that, with no type identity information, outputs RVB of random access memory 24 (FIG. 2) are at a high potential or in 1-condition to display white characters on a black background.

Read out operations are obviously performed at the same time in RAM memories 23 and 24 so as to read characters from permanent memories at the same time as conditions of output wires of 24 are controlled by identity bits in words F1, F2 and F3.

With respect to the bit corresponding to "Graphic" in word F1, it must be understood that, for instance close to permanent memory 34, a wired memory stores six-point rectangles, thus making it possible by displaying them side by side to produce graphics on the screen. In practice, the output of RAM memory 24 has a wire corresponding to the 4th bit of F1 which permits a selection the wired memory instead of the permanent memory 34 in a same manner as the selection controlled by wire M. Graphic rectangle codes are provided in the ACSII code.

In an alternative of the operation of the teletext system according to this invention, it is preferred to begin each row with a type identity word. The character type may possibly be changed within the row, but it returns to the initial type at the end of each row. Thus the display is resynchronized at the beginning of each row.

While the principles of the present invention have hereabove been described in relation with a specific embodiment, it must be clearly understood that the description has only been made by way of example and not as a limitation to the scope of this invention.

What is claimed is:

1. A receiver for a teletext system for digitally transmitting and displaying texts on a television screen, wherein a transmitter station broadcasts signals representing said text, said signals being in the form of data packs, sent over several channels, the data packs from different channels being randomly time multiplexed, each pack comprising a prefix signal for enabling a receiver to accept the data packs received over at least a selected channel and to reject data packs received over other channels, each of said data packs including the transmission in sequence of eight-bit words comprising, in addition to said prefix, page flags followed by page numbers and row flags followed by row numbers, escape eight-bit words followed by type identity eight-bit words, type identity eight-bit words, followed by a sequence of coded words identifying characters which are to be displayed in the same type which is identified by the identity words as determined by the preceding type identity words, said words receiver comprising first random access memory means for storing the coded character words at certain addresses, second random access memory means for storing the type identity words at the same certain addresses as the addresses of corresponding character words stored in the first random access memory, means for reading the words stored in the first random access memory means and at the same time as the read out if the words stored in the second random access memory, thereby simultaneously selecting a character and a type identity, and permanent memory means responsive to the read out of said second random access memory means for giving the shape of the characters read out from the first random access memory.

2. A teletext receiver for the system according to claim 5, and means responsive to output signals from the second random access memory means for controlling the luminance or chrominance in the display tube where the characters are displayed on the television tube.

3. A teletext receiver for the system according to claim 5, wherein the type identity eight-bit words following an escape eight-bit word comprise an identity component eight-bit word followed by an escape eight-bit word per character identity component, except for the last identity component eight-bit word that is directly followed by the first character eight-bit word of a sequence of characters to which the type is assigned and buffer memory means, switching circuit means for applying the received data to deliver the escape eight-bit words followed by type identity eight-bit words serially to said buffer memory means, said switching circuit means also delivering character eight-bit words or escape eight-bit words not followed by type identity eight-bit words to the input of the first random access memory means, the buffer memory means output being connected to said second random access memory input for delivering its contents, except for the escape eight-bit words, to said second random access memory means each time a character belonging to said sequence is written into the first random access memory means, the contents of the buffer memory means being erased when the next escape eight-bit word followed by a type identity or type component identity eight-bit word is received.

4. A teletext receiver for the system according to claim 2 wherein the type identity eight-bit words following an escape eight-bit word comprises an identity component eight-bit word followed by an escape eight-bit word per character identity component, except for the last identity component eight-bit word that is directly followed by the first character eight-bit word of a sequence of characters to which the type is assigned, and buffer memory means, switching means for applying the received data escape eight-bit words followed by type identity eight-bit words serially to said buffer memory means and character eight-bit words or escape eight-bit words not followed by type identity eight-bit words to the input of the first random access memory means, said buffer memory means output being connected to said second random access memory means input and delivering its contents, except for escape eight-bit words, to said second random access memory means each time a character belonging to said sequence is written into the first random access memory means, the contents of the buffer memoring means being erased when the next escape eight-bit word followed by a type or type component identity eight-bit word is received.

* * * * *

UNITED STATES PATENT AND TRADEMARK OFFICE
CERTIFICATE OF CORRECTION

PATENT NO. : 4,213,124

DATED : July 15, 1980

INVENTOR(S) : Jean F. Barda et al

It is certified that error appears in the above-identified patent and that said Letters Patent are hereby corrected as shown below:

Abstract
Line 10, delete "which are"

Abstract
Line 11, insert --which are-- after the comma

Col. 1, Line 3, insert a comma --,-- after "description"

Col. 2, Line 8, delete the comma

Col. 2, Line 9, delete "in turn"; insert --, in turn,-- after "are"

Col. 3, Line 6, delete "which are"

Col. 3, Line 7, insert --which are-- after "words"

Figure 1:
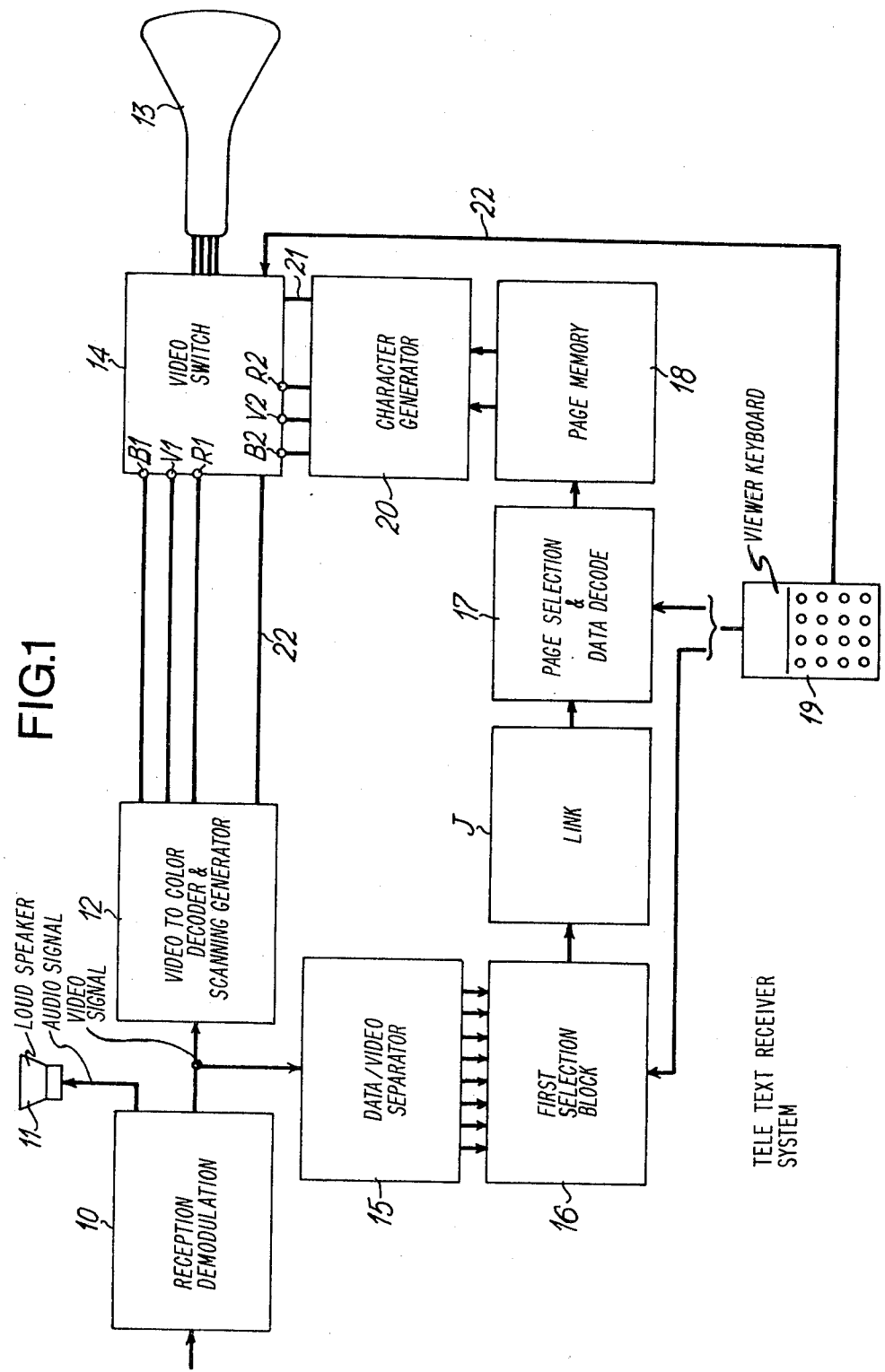
Figure 2:
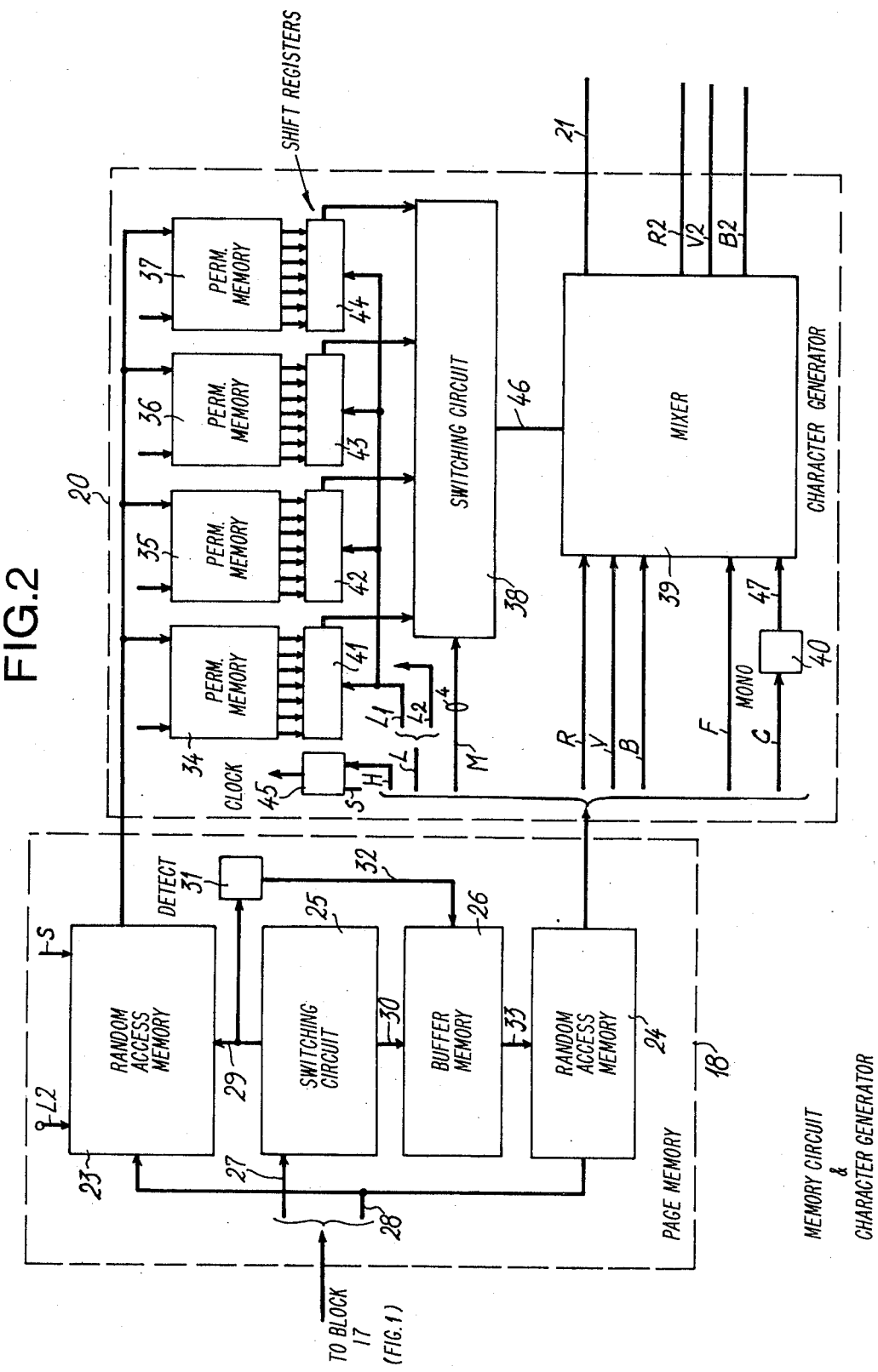

Col. 3, Line 32, change "Fig. 6" to --Fig. 1--

Col. 3, Line 34, insert --be-- after "may"

Col. 3, Line 43, change "these" to --. These--

UNITED STATES PATENT AND TRADEMARK OFFICE
CERTIFICATE OF CORRECTION

PATENT NO. : 4,213,124

DATED : July 15, 1980

INVENTOR(S) : Jean F. Barda et al

It is certified that error appears in the above-identified patent and that said Letters Patent are hereby corrected as shown below:

Col. 4, Line 17, insert a comma --,-- after "viewer"

Col. 4, Line 18, insert --the-- after the comma

Col. 5, Line 36, insert --a-- after "initiates"

Col. 6, Line 12, insert a comma --,-- after "read-out"

Col. 6, Line 17, delete "there"

Col. 6, Line 18, delete "are"

Col. 6, Line 18, insert --there are-- after "as"

Col. 7, Line 9, insert --connecting-- after "as" (2nd occurrence)

Col. 8, Line 15, insert --of-- after "selection"

Claim 2, Line 2, change "5" to --1--

Claim 3, Line 2, change "5" to --1--

Signed and Sealed this

Ninth Day of December 1980

[SEAL]

Attest:

SIDNEY A. DIAMOND

Attesting Officer

Commissioner of Patents and Trademarks